(No Model.)  2 Sheets—Sheet 1.

L. H. DWELLEY.
COMBINED HAY RAKE AND LOADER.

No. 367,278.  Patented July 26, 1887.

WITNESSES
W. J. Cambridge
J. S. F. Huddleston

INVENTOR
Lucius H. Dwelley
By F. E. Teschemacher
Atty (No Model.) 2 Sheets—Sheet 2.
L. H. DWELLEY.
COMBINED HAY RAKE AND LOADER.
No. 367,278. Patented July 26, 1887.
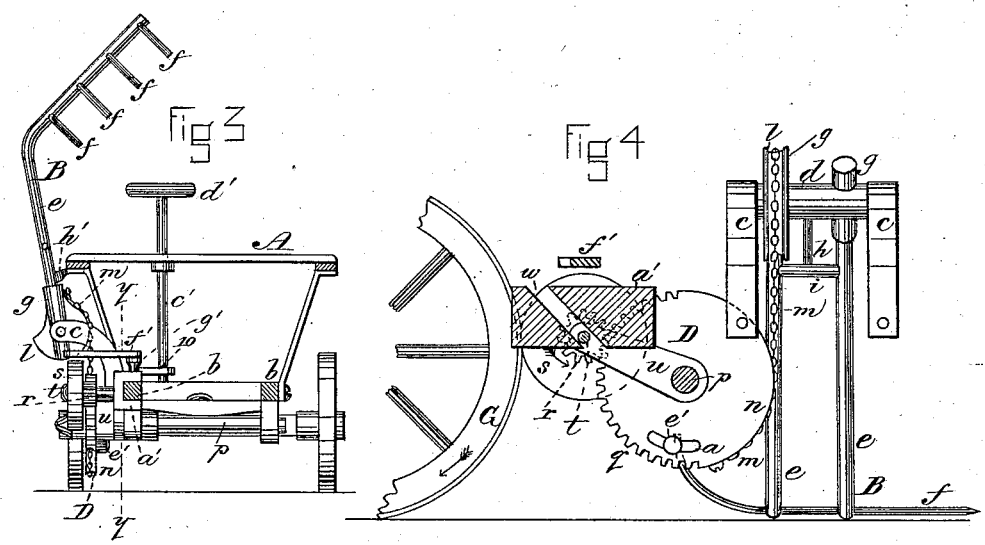
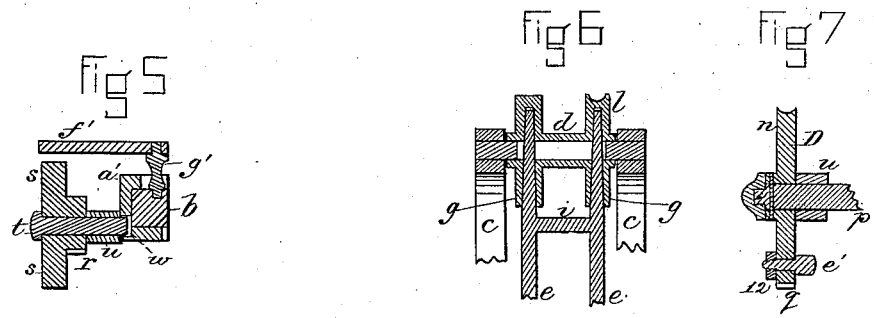
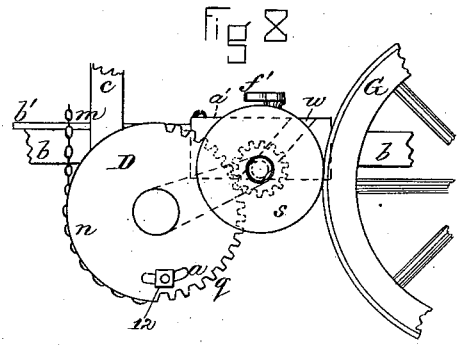
WITNESSES
W. J. Cambridge
J. S. T. Huddleston
INVENTOR
Lucius H. Dwelley
By J. E. Tschernach
Atty

UNITED STATES PATENT OFFICE.

LUCIUS H. DWELLEY, OF FOXCROFT, MAINE.

COMBINED HAY RAKE AND LOADER.

SPECIFICATION forming part of Letters Patent No. 367,278, dated July 26, 1887.

Application filed June 5, 1886. Serial No. 204,268. (No model.)

*To all whom it may concern:*

Be it known that I, LUCIUS H. DWELLEY, a citizen of the United States, residing at Foxcroft, in the county of Piscataquis and State of Maine, have invented certain Combined Hay Rake and Loader, of which the following is a full, clear, and exact description, reference being had to the accompanying drawings, making part of this specification, in which—

Figure 1:
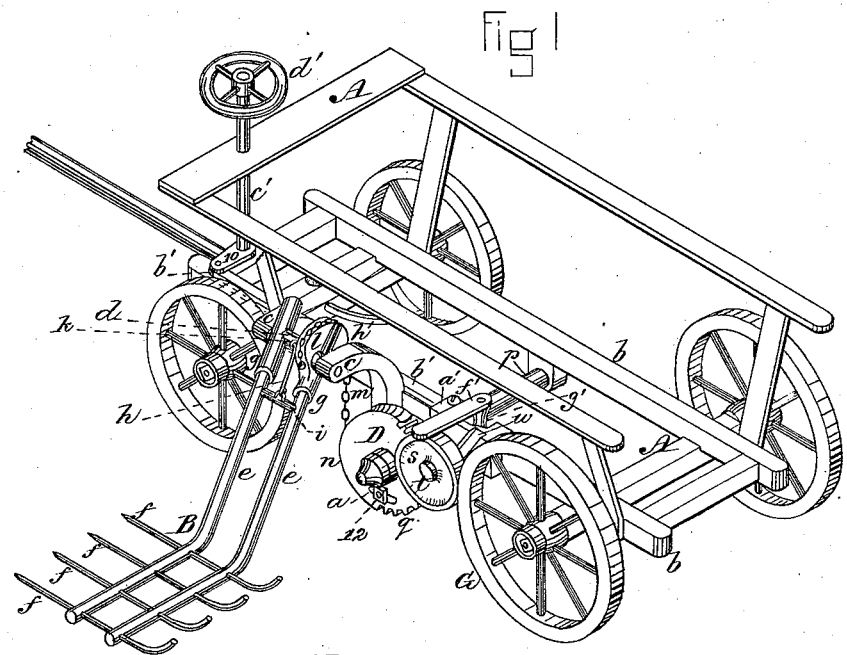
Figure 2:
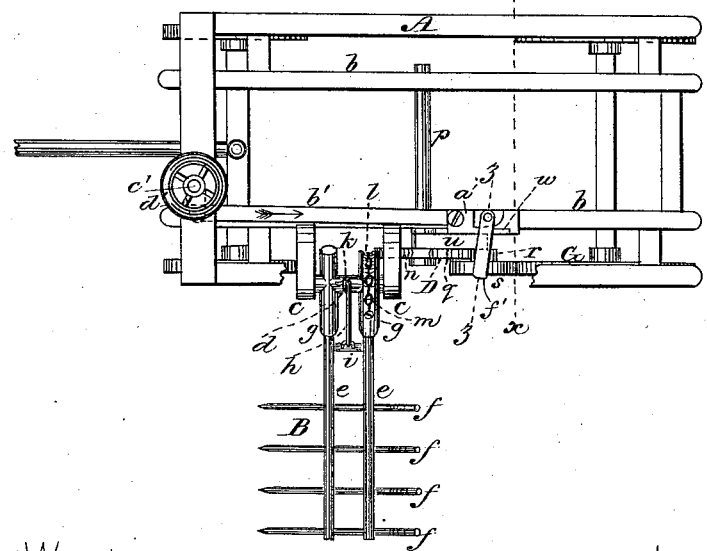

Figure 1 is a perspective view of a hay-wagon having my improved hay-loading attachment applied thereto. Fig. 2 is a plan of the same. Fig. 3 is a transverse vertical section on the line $x\,x$ of Fig. 2. Fig. 4 is an enlarged longitudinal vertical section on the line $y\,y$ of Fig. 3, the parts being in a different position. Fig. 5 is an enlarged vertical section on the line $z\,z$ of Fig. 2. Fig. 6 is a sectional detail of the upper portion of the rake and its carrier-shaft. Fig. 7 is a sectional detail to be referred to. Fig. 8 is a side elevation of a portion of the load-elevating mechanism.

My invention has for its object to provide a loading device of simple construction which can be easily and cheaply applied to hay and other wagons or carts, and which is adapted to be operated automatically by a friction-wheel brought into contact with and rotated by one of the wheels of the said wagon or cart.

To this end my invention consists in certain novel mechanism for lifting the load and for automatically regulating the pressure of the friction-wheel upon the wagon or cart wheel in proportion to the weight of the load being raised; and my invention also consists in certain details of construction, as hereinafter set forth and specifically claimed.

In the said drawings, A represents an ordinary four-wheeled hay-wagon, and $b\,b$ the longitudinal sills thereof. To one of these sills are secured two outwardly-projecting curved arms or hangers, $c\,c$, between the outer ends of which is pivoted the carrier-shaft $d$ of the rake or loading device B, which is composed of two parallel arms or rods, $e\,e$, bent, as shown, so that their lower portions will be close to the ground when in the position seen in Fig. 1, and provided with a series of rods or rake-teeth, $f$, pointed at their front ends and curved upward at their rear ends, this rake being adapted, as the wagon is driven forward, to rake up or gather a mass of hay from a windrow, or to take up an entire cock of hay as it passes beneath it. The inner ends of the arms $e\,e$ are made slightly tapering and fit into sockets $g$, as seen in Fig. 6, made integral with the carrier-shaft $d$, and are confined securely in place by means of a latch or hook, $h$, which is pivoted to the cross-bar $i$, and engages with an eye, $k$, on the shaft $d$. Any other suitable catch or locking device may, however, be employed, if preferred. The rake can thus be easily and quickly detached from its carrier-shaft whenever desired, and again replaced, which will be found a great convenience on many occasions.

At one end of the carrier-shaft $d$, and made integral therewith, is a segmental sheave, $l$, having a grooved periphery, to which is secured one end of a rope or chain, $m$, the opposite end of which is attached to the periphery of the load-lifting wheel D, a portion, $n$, of which is provided with a groove for the reception of the said chain $m$, thus forming the segment of a sheave. This wheel D is secured to one end of a transverse shaft, $p$, mounted in bearings attached to the sills $b\,b$; but it may, if preferred, be arranged to rotate upon a suitable stud projecting from the side of the wagon. A portion of the periphery of the wheel D is provided with teeth $q$, with which meshes a pinion, $r$, made integral with or secured to the inner side of a friction-wheel, $s$, which, with the pinion $r$, rotates freely upon a stud, $t$, at the outer end of a supporting-arm, $u$, the opposite or inner end of which is pivoted upon the shaft $p$ of the wheel D.

The friction-wheel $s$ and pinion $r$ may be made integral, as shown, or they may be immovably secured to opposite ends of a short shaft supported in a suitable bearing in the end of the arm $u$. This friction-wheel $s$ is arranged in close proximity with one of the wheels, G, of the wagon or cart, and is brought into contact therewith, so as to be rotated thereby, or withdrawn therefrom in the following manner: The inner end of the stud $t$ projects into an inclined groove, $w$, in a slide, $a'$, which is fitted to move on one of the sills $b$; or it may, if desired, be adapted to move upon a suitable casting secured to the said sill $b$. To the front end of this slide $a'$ is pivoted a rod or bar, $b'$, the opposite end of which is pivoted to a crank, 10, at the lower end of a vertical shaft, $c'$, provided at its upper end with a hand-wheel, $d'$, located in a convenient position accessible to the driver of the wagon, and thus when the slide $a'$ is moved by means of the hand-wheel $d'$ in the direction of the arrow, Fig. 2, the inclined groove $w$, acting on the end of the stud $t$, depresses the pivoted arm $u$, and thus brings the friction-wheel $s$ firmly into contact with the wagon-wheel G, which then rotates the said friction-wheel, the motion of which is communicated through the pinion $r$ to the toothed load-lifting wheel D, and thence by means of the chain $m$ to the carrier-shaft $d$ of the rake B, which is thus raised in the arc of a circle with its load of hay into a vertical or nearly vertical position, as seen in Fig. 3, when the hay will be discharged into the wagon as desired, dropping by its own gravity as soon as the rake has been elevated to the required height. When the rake has been raised to this point, a projection, $e'$, Figs. 3 and 4, on the inner side of the wheel D is brought into contact with the arm $u$, thus raising the latter and automatically withdrawing the friction-wheel $s$ out of contact with the wagon-wheel G, when the weight of the rake will cause it to descend to the ground and assume the position seen in Fig. 1, ready to receive another load, and as soon as a sufficient quantity has been gathered by the rake from the windrow, or the rake has passed under a cock of hay, the driver, by means of the hand-wheel, again brings the friction-wheel $s$ into contact with the wagon-wheel, when the rake is again raised to discharge its load into the wagon, and the operation continues as before.

The projection $e'$ is made adjustable by means of a threaded shank passing through a slot, $a$, in the wheel D and a nut, 12, Figs. 1 and 7, on the outside of the said wheel D, whereby the projection $e'$ can be set to cause the upward movement of the rake to be automatically arrested at the desired point.

In order to prevent the rake B from dropping too suddenly, and thus producing a shock or concussion by contact with the ground, I provide a brake-bar, $f'$, which is supported on a post, $g'$, and is arranged to project over the friction-wheel $s$ in such manner that by moving forward the slide $a'$ by means of the hand-wheel $d'$ the friction-wheel can be brought with more or less pressure against the said brake-bar $f'$, whereby the rake may be caused to descend slowly and easily, as desired, or by exerting sufficient force the rotation of the friction-wheel may be completely arrested and the rake, with or without its load, held in any position desired.

To the upper portion of the wagon-frame is secured a flat spring, $h'$, which forms a buffer for the rake to strike against as it is raised, and, in case it should pass the center, serves to throw it back into a position to insure its dropping by its own gravity.

It will be seen that in raising the load as the wagon moves forward the direction of motion of the pinion $r$, which acts upon the teeth $q$ of the load-lifting wheel D, is such that the resistance offered by the wheel D will tend to depress the pinion $r$ and its pivoted supporting-arm $u$, and thus cause the friction-wheel $s$ to be crowded down more firmly against the wagon-wheel G, the pressure and friction being thus made proportionate to the weight of the load being raised, whereby all liability of slip is prevented and the mechanism caused to operate with certainty and precision.

Although the above-described mechanism is intended particularly as an attachment for hay wagons or carts, it is evident that it may be applied to other wagons or carts and be adapted to load the same with substances other than hay without departing from the spirit of my invention.

What I claim as my invention, and desire to secure by Letters Patent, is—

1. The combination, with a wagon or cart, of a friction-wheel mounted on a movable arm or support and rotated by contact with one of the wheels of said wagon or cart, a load-lifting wheel engaged and rotated by said friction-wheel, and gearing between the load-lifting and friction wheels, whereby the resistance produced in turning the lifting-wheel increases the friction between the friction and wagon or cart wheels, substantially as herein described.

2. The combination, with a wagon or cart, of a friction-wheel mounted on a movable support and adapted to be brought into contact with and rotated by one of the wheels of the said wagon or cart, a pinion operated by the said friction-wheel, a load-lifting wheel provided with teeth meshing with the pinion and adapted to be moved thereby, a rake or loading device pivotally connected to the side of the wagon or cart, a chain or rope operated by the load-lifting wheel, connected to and operating the rake or loading device, substantially as described, and the slide $a'$, connected with and operated by the hand-wheel $d'$, for actuating the movable support of the friction-wheel to bring the latter into contact with the wagon or cart wheel, substantially as set forth.

3. The combination, with the friction-wheel $s$ and the movable arm or support $u$, on which it is mounted, of the slide $a'$, provided with an inclined groove, $w$, for the reception of a stud or projection on the arm $u$, and having the operating-rod $b'$ connected thereto, substantially as described.

4. The combination, with the friction-wheel $s$ and the movable arm or support $u$, on which it is mounted, of the slide $a'$, provided with an inclined groove, $w$, for the reception of a stud or projection on the arm $u$, and having the rod $b'$ connected therewith, the crank 10, the vertical shaft $c'$, and the hand-wheel $d'$, all operating substantially as described.

5. The combination, with a wagon or cart, of a rake or loading device having an arm or arms adapted to fit into a socket or sockets in its carrier and made detachable therefrom, and a locking or fastening device for holding the said rake or loading device in place, substantially as set forth.

6. The combination, with the friction-wheel $s$, mounted on a movable arm or support and adapted to be brought into contact with the wagon or cart wheel G, of the load-lifting wheel D, provided with a projection, $e'$, located in position to engage the support of the friction-wheel and automatically throw the latter out of contact with the wagon or cart wheel when the load is raised to the desired height, substantially as herein described.

7. The combination, with the carrier-shaft $d$, mounted on a wagon or cart and provided with sockets $g$, of the rake or loading device B, having arms $e$, adapted to fit into the sockets $g$, and made detachable therefrom, and the hook or latch $h$, for securing the rake or loading device when adjusted in place, all operating substantially as described.

Witness my hand this 2d day of June, A. D. 1886.

LUCIUS H. DWELLEY.

In presence of—
P. E. TESCHEMACHER,
W. J. CAMBRIDGE.